(12) United States Patent
Arumugasamy et al.

(10) Patent No.: US 9,649,974 B1
(45) Date of Patent: May 16, 2017

(54) SYSTEM AND METHOD FOR ASSISTED REAL-TIME CONTROL OF VEHICLE HEADLIGHT

(71) Applicant: Wipro Limited, Bangalore (IN)

(72) Inventors: Parthasarathy Shunmugam Arumugasamy, Bangalore (IN); Raghavendra Hosabettu, Bangalore (IN)

(73) Assignee: WIPRO LIMITED, Bangalore (IN)

(*) Notice: Subject to any disclaimer, the term of this patent is extended or adjusted under 35 U.S.C. 154(b) by 0 days.

(21) Appl. No.: 15/065,043

(22) Filed: Mar. 9, 2016

(30) Foreign Application Priority Data

Feb. 17, 2016 (IN) .............................. 201641005527

(51) Int. Cl.
*B60Q 1/14* (2006.01)
*H05B 37/02* (2006.01)
*B60Q 1/20* (2006.01)
*B60Q 1/00* (2006.01)

(52) U.S. Cl.
CPC ........... *B60Q 1/143* (2013.01); *B60Q 1/0076* (2013.01); *B60Q 1/20* (2013.01); *H05B 37/0227* (2013.01); *H05B 37/0272* (2013.01)

(58) Field of Classification Search
CPC ........ B60Q 1/44; B60Q 1/143; B60Q 1/1423; B60Q 9/001; B60Q 2300/112; B60Q 2300/314; B60Q 1/1415; B60Q 2300/42
USPC ......................................... 315/76–78, 80, 82
See application file for complete search history.

(56) References Cited

U.S. PATENT DOCUMENTS

| | | |
|---|---|---|
| 2,632,040 A | 3/1953 | Rabinow |
| 3,177,397 A | 4/1965 | Keeran |
| 4,727,290 A | 2/1988 | Smith et al. |
| 5,086,253 A | 2/1992 | Lawler |

(Continued)

FOREIGN PATENT DOCUMENTS

| | | |
|---|---|---|
| EP | 1 962 226 A2 | 8/2008 |
| WO | WO 00/50260 | 8/2000 |

*Primary Examiner* — Minh D A
(74) *Attorney, Agent, or Firm* — Finnegan, Henderson, Farabow, Garrett & Dunner, LLP (57) ABSTRACT

This disclosure relates generally to controlling headlights and more particularly to a system and method for automatically controlling vehicle headlights using image processing techniques.

In one embodiment, a Headlight Controlling Device for automatically controlling vehicle headlights is disclosed. The Headlight Controlling Device comprises a processor and a memory communicatively coupled to the processor. The memory stores processor instructions, which, on execution, causes the processor to collect at least one of vehicle information, vehicle speed, road information, area information, weather information or a multimedia object associated with a forward path of the vehicle. The processor further determines a current light intensity distribution of the vehicle headlight based on the multimedia object. The processor further compares the current light intensity distribution of the vehicle headlight with an optimal light intensity distribution, wherein the optimal light intensity distribution is retrieved from a database based on at least one of the vehicle information, the vehicle speed, the road information, the area information or the weather information. The processor further controls the vehicle headlight based on the comparison.

15 Claims, 4 Drawing Sheets

(56) References Cited

U.S. PATENT DOCUMENTS 5,182,502 A 1/1993 Slotkowski et al.
2010/0100268 A1* 4/2010 Zhang .................. B60W 30/09
　　　　　　　　　　　　　　　　　701/25

* cited by examiner

SYSTEM AND METHOD FOR ASSISTED REAL-TIME CONTROL OF VEHICLE HEADLIGHT

PRIORITY CLAIM

This U.S. patent application claims priority under 35 U.S.C. §119 to Indian Application No. 201641005527, filed Feb. 17, 2016. The aforementioned applications are incorporated herein by reference in their entirety.

TECHNICAL FIELD

This disclosure relates generally to controlling headlights of a vehicle and more particularly to a system and method for automatically controlling vehicle headlights using image processing techniques.

BACKGROUND

Vehicle headlights are typically used to improve visibility, when the visibility conditions are low due to fog, rain, smoke, darkness and the like. Nowadays, vehicles provide a large variety of headlights. Some of these headlights may include fog lights, driving lights, off-road lights, bumper lights, multiple bulb headlights, high beam lights, low beam lights, etc. Low beam lights generally provide less field of illumination, when compared to high beam lights and hence are ideal for use on urban roads with street lights or in heavy traffic conditions. On the other hand, high beam lights may typically be used in rural roads or poorly lit roads or on highways or freeways when there is no oncoming traffic.

Currently, vehicle drivers are expected to manually switch between high and low beams and various other configurations of the lights based on instinct and defined guidelines. For example, a driver may have to manually turn on the fog lamps in case the driver experiences fog conditions. In another example, a driver may have to switch the lights from a high beam to a low beam when another vehicle approaches from the opposite side. Failure to do so may cause the driver of the oncoming vehicle to be momentarily blinded which may lead to accidents. The high beam may affect the driver driving ahead as well, because the lights may get reflected through the rear view mirror and the side mirrors of the car ahead.

However, sometimes, drivers might not be aware of which type of light to be used under a particular circumstance. Also, sometimes, drivers might not be able to make a quick judgement in controlling the vehicle headlights. The failure to switch to the appropriate headlights or mode of headlights may lead to unsafe conditions for the driver of the vehicle as well as other vehicles on the road.

SUMMARY

In an embodiment the present disclosure illustrates a method for automatically controlling a vehicle headlight. The method comprises, collecting, by a Headlight Controlling Device, at least one of vehicle information, vehicle speed, road information, area information, weather information or a multimedia object associated with a forward path of a vehicle. The method further comprises, determining, by the Headlight Controlling Device, a current light intensity distribution of the vehicle headlight based on the multimedia object. The method further comprises, comparing, by the Headlight Controlling Device, the current light intensity distribution of the vehicle headlight with an optimal light intensity distribution, wherein the optimal light intensity distribution is retrieved from a database based on at least one of the vehicle information, the vehicle speed, the road information, the area information or the weather information. The method further comprises, controlling, by the Headlight Controlling Device, the vehicle headlight, based on the comparison.

In another embodiment, the present disclosure illustrates a Headlight Controlling Device. The Headlight Controlling Device comprises a processor and a memory communicatively coupled to the processor. The memory stores processor instructions, which, on execution, causes the processor to collect at least one of vehicle information, vehicle speed, road information, area information, weather information or a multimedia object associated with a forward path of the vehicle. The processor further determines a current light intensity distribution of the vehicle headlight based on the multimedia object. The processor further compares the current light intensity distribution of the vehicle headlight with an optimal light intensity distribution, wherein the optimal light intensity distribution is retrieved from a database based on at least one of the vehicle information, the vehicle speed, the road information, the area information or the weather information. The processor further controls the vehicle headlight based on the comparison.

In another embodiment, a non-transitory computer-readable storage medium for assisted real-time control of a vehicle headlight, is disclosed, which when executed by a computing device, cause the computing device to perform operations comprising collecting at least one of vehicle information, vehicle speed, road information, area information, weather information or a multimedia object associated with a forward path of the vehicle. The operations further comprise determining a current light intensity distribution of the vehicle headlight based on the multimedia object. The operations further comprise comparing the current light intensity distribution of the vehicle headlight with an optimal light intensity distribution, wherein the optimal light intensity distribution is retrieved from a database based on at least one of the vehicle information, the vehicle speed, the road information, the area information or the weather information. The operations further comprise controlling the vehicle headlight based on the comparison.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system and method for assisted real-time control of a vehicle headlight. The system and method may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the system and method may be implemented in other computing systems, albeit with a few variations, as will be understood by a person skilled in the art.

Working of the systems and methods for assisted real-time control of the vehicle headlight is described in conjunction with FIGS. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
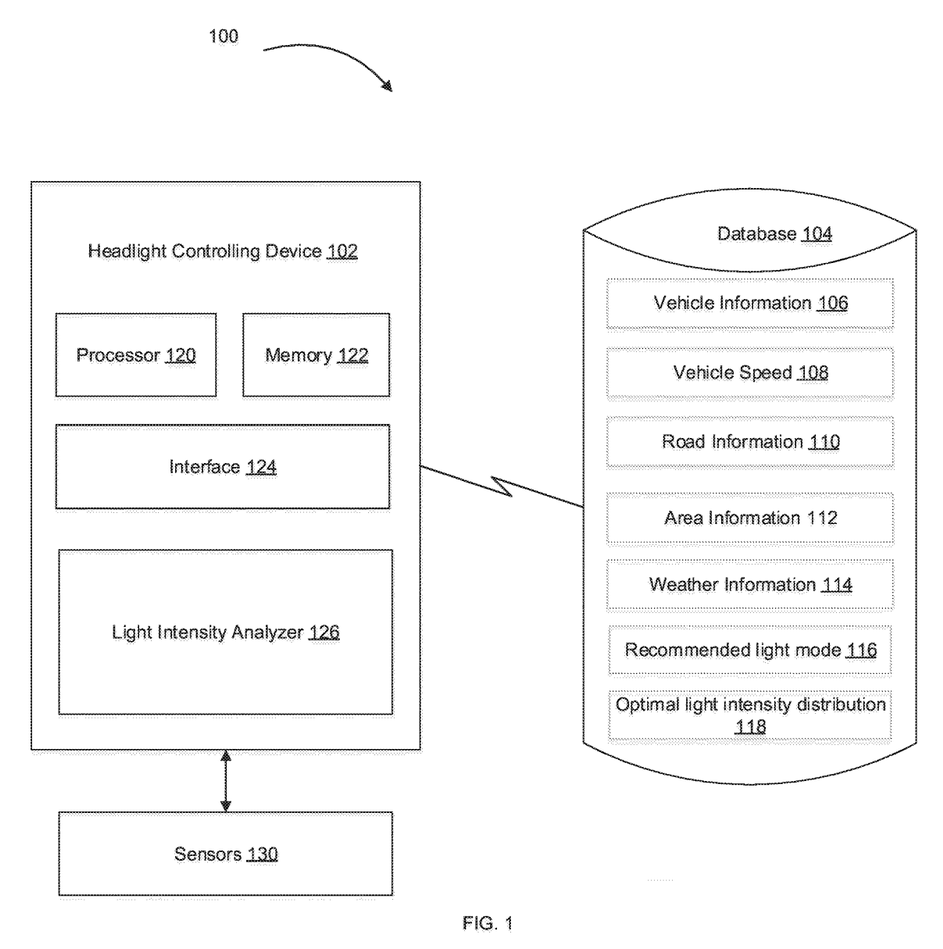
FIG. 1 illustrates an exemplary network implementation comprising a Headlight Controlling Device for assisting in real-time control of vehicle headlight, according to some embodiments of the present disclosure.

FIG. 1 illustrates an exemplary network environment 100 comprising a Headlight Controlling Device 102, in accordance with some embodiments of the present disclosure. As shown in FIG. 1, the Headlight Controlling Device 102, is communicatively coupled to a database 104. Although the database 104 is shown external to the Headlight Controlling Device 102 in FIG. 1, it may be noted that, in one implementation, the database 104 may be present within the Headlight Controlling Device 102.

The Headlight Controlling Device 102 may be implemented on variety of computing systems.

The database 104 may comprise vehicle information 106, vehicle speed 108, road information 110, area information 112, weather information 114, recommended light mode 116 and optimal light intensity distribution 118. The vehicle information 106 may comprise at least one of vehicle type, vehicle size or vehicle position. The road information 110 may comprise at least one of road type, route number, driving side or road conditions.

The Headlight Controlling Device 102 may be communicatively coupled to the database 104 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, Including routers, bridges, servers, computing devices, storage devices, etc.

As shown in FIG. 1, the Headlight Controlling Device 102 comprises a processor 120, a memory 122 coupled to the processor 120, and interface(s) 124. The processor 120 may be implemented as one or more microprocessors, microcomputers, microcontrollers, digital signal processors, central processing units, state machines, logic circuitries, and/or any devices that manipulate signals based on operational instructions. Among other capabilities, the processor 120 is configured to fetch and execute computer-readable instructions stored in the memory 122. The memory 122 can include any non-transitory computer-readable medium known in the art including, for example, volatile memory 122 (e.g., RAM), and/or non-volatile memory 122 (e.g., EPROM, flash memory, etc.).

The interface(s) 124 may include a variety of software and hardware interfaces, for example, a web interface, a graphical user interface, etc., allowing the Headlight Controlling Device 102 to interact with user devices. Further, the interface(s) 124 may enable the Headlight Controlling Device 102 respectively to communicate with other computing devices. The interface(s) 124 can facilitate multiple communications within a wide variety of networks and protocol types, Including wired networks, for example LAN, cable, etc., and wireless networks such as WLAN, cellular, or satellite. The interface(s) 124 may include one or more ports for connecting a number of devices to each other or to another server.

Figure 2:
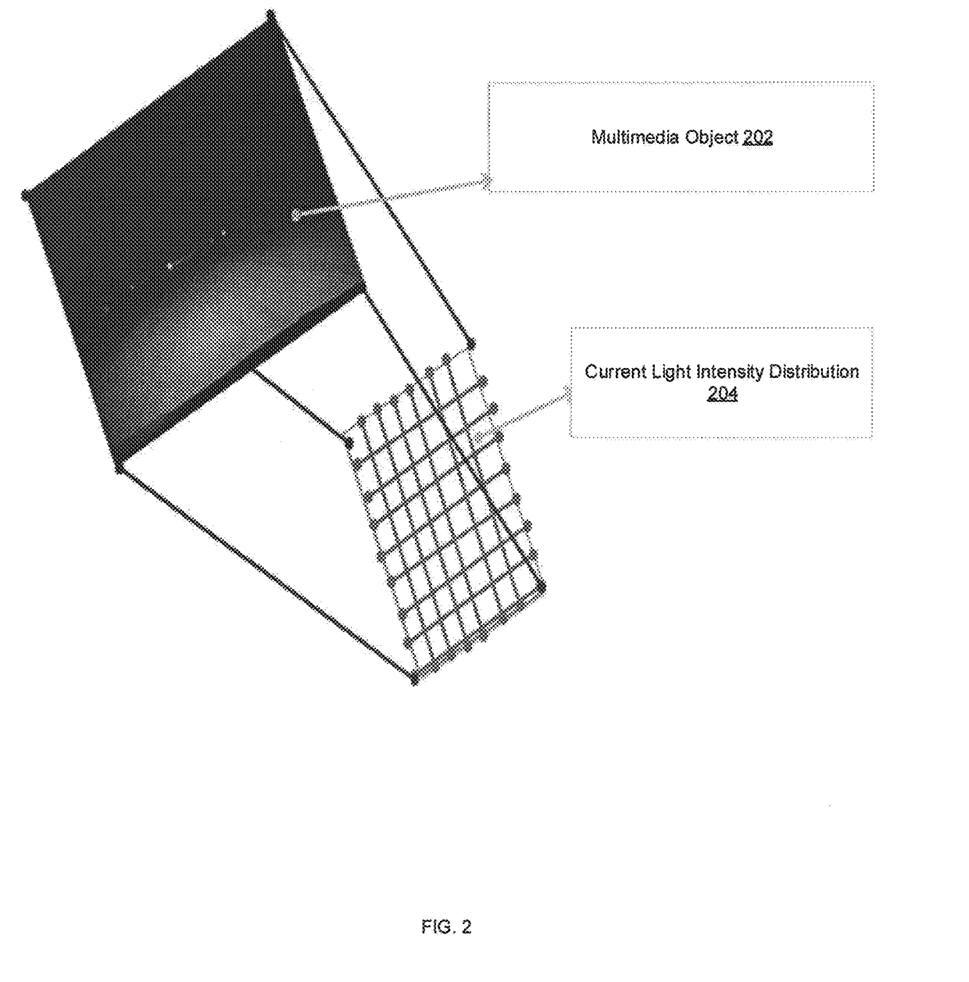
FIG. 2 illustrates the generation of a current light intensity distribution from a multimedia object in accordance with some embodiments of the present disclosure.

In order to assist in real-time control of the vehicle headlight, a Light intensity analyzer 126 may receive at least one of the vehicle information 106, the vehicle speed 108, the road information 110, the area information 112, the weather information 114 or a multimedia object 202 associated with a forward path of a vehicle, wherein the multimedia object 202 may comprise at least one of a video or an Image.

After receiving the vehicle information 106, the vehicle speed 108, the road information 110, the area information 112, the weather information 114 and the multimedia object 202, the Light intensity analyzer 126 may determine a current light intensity distribution 204 of the vehicle headlight 128 based on the multimedia object 202. This is shown in FIG. 2. In one embodiment, the current light intensity distribution 204 may be determined based on an intensity Histogram of a Red-Green-Blue (RGB) image, which may be derived from the multimedia object 202. An alternative embodiment may be to derive an RGB image from the multimedia object 202 and to convert it into a Grayscale image. Then the current light intensity distribution 204 may be determined based on the Intensity Histogram of the Grayscale image.

After determining the current light intensity distribution 204, the Light Intensity Analyzer 126, compares the current light intensity distribution 204 with an optimal light intensity distribution 118, wherein the optimal light intensity distribution 118 is retrieved by looking-up the database 104 using current vehicle parameters. The current vehicle parameters may include the vehicle information 106, the vehicle speed 108, the road information 110, the area information 112 and the weather information 114.

After comparing the current light intensity distribution 204 with the optimal light intensity distribution 118, the vehicle headlight 128 may be controlled based on the comparison. In one implementation, the vehicle headlight 128 may be switched between low beam and high beam or between higher light intensity and lower light intensity. The vehicle headlight 128 may be switched between various other configurations of the vehicle headlight 128 to bring the vehicle to the optimal light intensity distribution 118.

Figure 3:
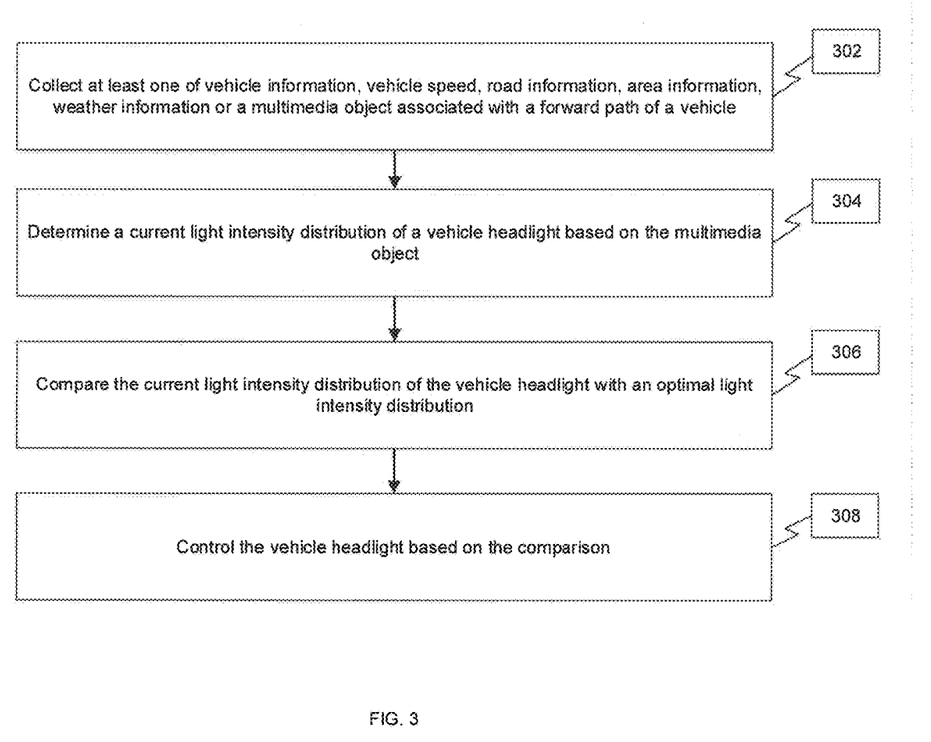
FIG. 3 is a flow diagram illustrating a method of real-time control of a vehicle headlight in accordance with some embodiments of the present disclosure.

FIG. 3 is a flow diagram Illustrating a method for assisted real-time control of a vehicle headlight. With reference to FIG. 3, at step 302, parameters including but not limited to, the vehicle information 106, the vehicle speed 108, the road information 110, the area information 112 and the weather information 114 may be collected. Further, the multimedia object 202, which may include an image or a video, may also be captured. The image or the video may capture the field of view of a driver of the vehicle as the vehicle moves in a forward path. The multimedia object 202 may be captured using one or more image capturing devices.

In some embodiments, one or more of the vehicle information 106, the vehicle speed 108, the road information 110, the area information 112 and the weather information 114 may be collected in real time. For example, the driver may be uniquely associated with the registration number of the vehicle and the vehicle registration number may be looked up in a database 104 to determine the type of the vehicle. The vehicle speed 108, the road information, 110 the area information 112 and the weather information 114 may be collected in real time due to the dynamic nature of the information. In some other embodiments, the vehicle information 106 may be predefined. For example, the vehicle information 106 may be provided by the driver during a registration process. The driver may also provide a driving side i.e. whether the vehicle is being driven in a left-driving country or a right-driving country.

Here, the vehicle information 106 may comprise vehicle type, vehicle size and vehicle position. The Vehicle type may indicate, for example, if the vehicle is a Sports Utility Vehicle (SUV), a sedan, a truck, a van etc., and the vehicle size may indicate if the vehicle is a minicompact, a subcompact, a compact, a midsize, a large vehicle etc. The vehicle position, the vehicle speed 108 and the area information 112 may be collected through a Global Positioning System (GPS) associated with the vehicle. In some embodiments, the vehicle position may be obtained by a satellite ranging method, which involves measuring the distance between a GPS receiver and GPS satellites. In some embodiments, the vehicle speed 108 may be calculated using the Doppler Effect. GPS may implement receivers to continuously track carder frequencies generated by satellites. The Doppler shift, which is the difference between the known satellite carrier frequency and the frequency determined at the receiver, is directly proportional to the velocity of the receiver. This may be used to calculate the speed of the vehicle. Further, in some embodiments, the area information 112 may be determined using Geographic information Systems (GIS). The GPS data is compared with geographic map data and road data in order to determine the area information. Examples for the area information 112 may be urban, suburban, rural etc. Examples for the weather information 114 may be windy, sunny, cloudy etc. Further, in some embodiments, the weather information 114 might be obtained by using weather sensors 130.

In addition to the vehicle information 106, the vehicle speed 108, the area information 112 and the weather information 114, the road information 110 may also be collected at step 302. Here, the road information 110 may include road type, route number, driving side or road conditions. The road type, the route number and the road conditions may be determined using GIS. The road type may indicate, for example, whether the road is a highway, a rural road, an interstate road, a motorway, an arterial road, a mountain road, a pedestrian zone, a trunk road, an expressway, etc. The driving side may be left or right, depending on whether the vehicle is being driven in a left-driving country or a right-driving country. The "road conditions" parameter may include information on whether the road is accident prone, is of degraded quality, under construction, under illuminated, etc.

In addition to the vehicle information 106, the vehicle speed 108, the road information 110, the area information 112 and the weather information 114, the multimedia object 202 may also be collected at step 302. The multimedia objects 202 are captured using the image capturing devices. The multimedia object 202 may be an image or a video of the area in front of the vehicle. This may typically include the view of the driver as the vehicle moves in a forward path.

Once the multimedia object 202 is captured, a current light intensity distribution 204 of the vehicle headlight 128 may be determined based on the multimedia object 202 at step 304. The current light intensity distribution 204 may represent the distribution of light as seen by the driver of the vehicle. The light intensity distribution as determined from the image or video of the forward path of the vehicle may represent light distribution from various sources as the vehicle moves in a forward path. For example, the light sources may include the headlight of the vehicle, light from street lights, headlights from oncoming vehicles, tail lights from other vehicles travelling in the same direction as the vehicle, lights from billboards, etc. Image capturing techniques may be used on the image or the video captured by the image capturing device to determine the light intensity distribution. In some embodiments, the light intensity distribution may be determined from a histogram of the image.

In some embodiments, the current light intensity distribution 204 may be determined by first deriving the RGB image from the multimedia object 202 and then converting the derived RGB image into a Grayscale image and finally determining the Intensity Histogram of the Grayscale image. In an alternative embodiment, the current light intensity distribution may be determined by determining the Intensity Histogram of the RGB image. Noise may be eliminated from the RGB image by using Filtering Techniques like an averaging filter or a median filter etc. Skew error may be eliminated by providing skew correction like top line, scan line, etc.

On determining the current light intensity distribution 204, the current light intensity distribution 204 may be compared with an optimal light intensity distribution 118 at step 306. The optimal light intensity distribution 118 may represent the ideal or optimal light distribution for a particular set of parameter values. In other words, the optimal light intensity distribution 118 may suggest the optimal headlight configuration by taking into consideration parameters such as the vehicle information 106, the vehicle speed 108, the road information 110, the area information 112 and the weather information 114, herein after referred to as current vehicle parameters. To determine the optimal light intensity distribution 118 for a set of current vehicle parameters or for a given set of conditions, a database 104 may be looked-up using the set of current vehicle parameters or the set of conditions. The database 104 may include a predefined mapping between the current vehicle parameters or conditions and the optimal light intensity distribution 118 for those current vehicle parameters. Further, the database 104 may include a recommended headlight mode 116 to achieve the optimal light distribution.

At step 308, the vehicle headlight 128 may be controlled based on the comparison between the current light intensity distribution 204 and the optimal light intensity distribution 118. The vehicle headlight 128 may be controlled either by altering the headlight mode or by altering the light intensities. The current light intensity distribution 204 may be altered to match the optimal light intensity distribution 118. If the current light intensity distribution 204 is lesser than the optimal light intensity distribution 118, then the vehicle headlight 128 may be switched from low beam to high beam or from lower light intensity to higher light intensity. If the current light intensity distribution 204 is greater than the optimal light intensity distribution 118, then the vehicle headlight 128 may be switched from high beam to low beam or from higher light intensity to lower light intensity. Optimal light intensity distributions 118 corresponding to various permutations and combinations of possible values of the parameters may be stored in the database 104. These optimal light intensity distributions 118 may be looked up using the current vehicle parameter values. For example, if the weather information 114 as collected in step 302 indicates foggy conditions and the optimal light intensity distribution 118 indicates that a wider spread of light is required when compared to the current light intensity distribution 204 of the headlights, then the recommended mode 116 may suggest to the driver of the vehicle to turn on the fog lamps of the vehicle. In some other embodiments, headlight controlling device 102 may automatically change the configuration of the headlights to achieve the recommended mode, in this case, automatically switching the fog lights on. Consider another illustration where the vehicle is being driven on a road that is accident prone. The road information 110 may be collected in step 302 and the optimal light intensity distribution 118 may indicate that a higher intensity of light is required when compared with the current light intensity distribution 204 of the headlights. Then the headlight mode may suggest to switch or automatically switch from low beam mode to high beam mode or from lower light intensity to higher light intensity and not to switch if it is already in the high beam mode. Consider another illustration where the vehicle is being driven in a rural area. The area information 112 may be collected in step 302 and the optimal light intensity distribution 118 may indicate that a higher intensity of light is required when compared with the current light intensity distribution 204 of the headlights. This may be due to the fact that there are less traffic in the rural areas and hence a lesser chance of blinding an oncoming vehicle driver with high beam. Hence, the headlight mode may suggest to switch from low beam mode to high beam mode or from lower light intensity to higher light intensity and not to switch, if the vehicle is already in the high beam mode Headlight controlling device 102 alters the mode of the headlight to match the recommended light mode 116, i.e. it switches from low beam to high beam, if the current mode is in low beam, or makes no change if the current mode is in high beam.

Computer System

Figure 4:
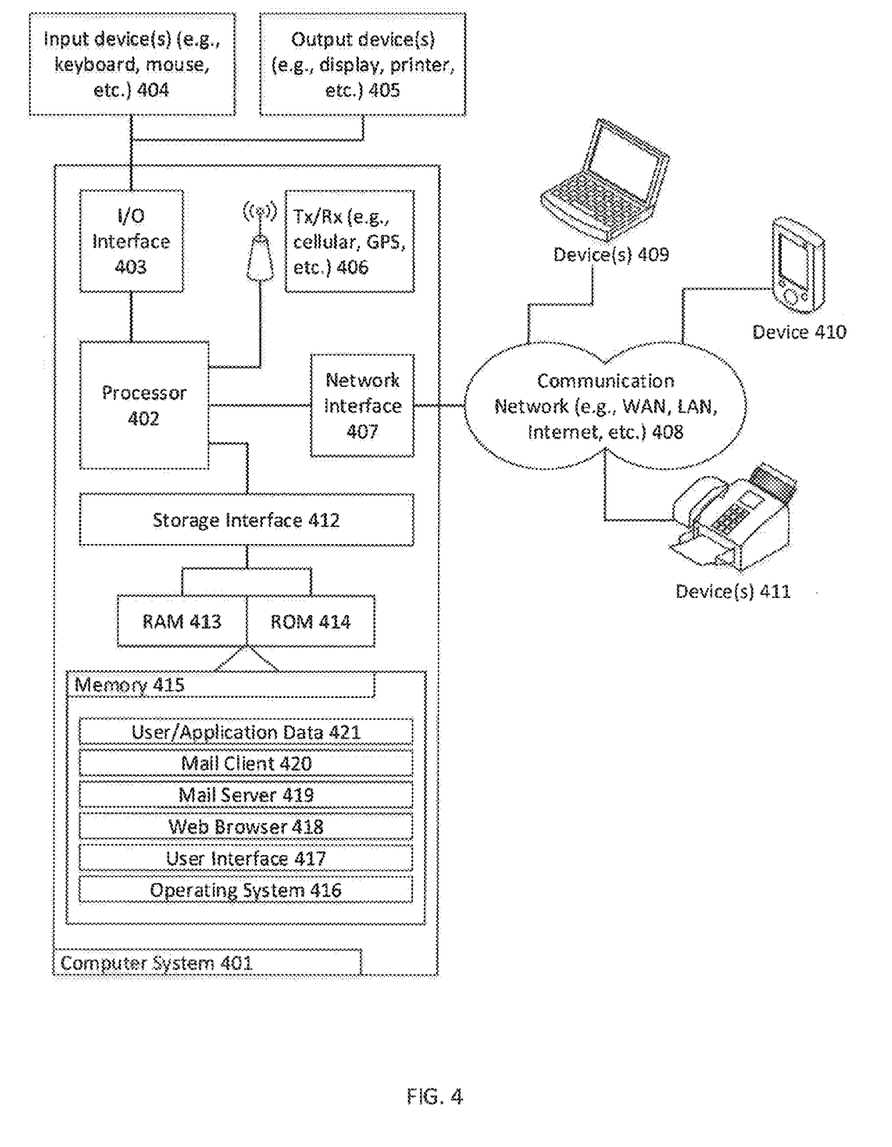
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the Light Intensity Analyzer 126. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia Interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/ source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of Independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described application title. The Illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of automatically controlling a vehicle headlight, the method comprising:

collecting, by a Headlight Controlling Device, at least one of vehicle information, vehicle speed, road information, area information, weather information or a multimedia object associated with a forward path of the vehicle;

determining, by the Headlight Controlling Device, a current light intensity distribution of the vehicle headlight based on the multimedia object;

comparing, by the Headlight Controlling Device, the current light intensity distribution of the vehicle headlight with an optimal light intensity distribution, wherein the optimal light intensity distribution is retrieved from a database based on at least one of the vehicle information, the vehicle speed, the road information, the area information or the weather information; and controlling, by the Headlight Controlling Device, the vehicle headlight based on the comparison.

2. The method as claimed in claim 1, wherein the vehicle information comprises at least one of vehicle type, vehicle size or vehicle position.

3. The method as claimed in claim 1, wherein the road information comprises at least one of road type, route number, driving side or road conditions.

4. The method as claimed in claim 3, wherein the road type, the route number and the road conditions are determined based on a Global Positioning System.

5. The method as claimed in claim 1, wherein the multimedia object comprises at least one of a video and an image.

6. The method as claimed in claim 1, wherein controlling the vehicle headlight comprises altering a headlight mode.

7. The method as claimed in claim 1, wherein controlling the vehicle headlight comprises altering light intensities of the vehicle headlight.

8. A Headlight Controlling Device for automatically controlling a vehicle headlight, the Headlight Controlling Device comprising:

a processor;

a memory communicatively coupled to the processor, wherein the memory stores the processor-executable instructions, which, on execution, causes the processor to:

collect at least one of vehicle information, vehicle speed, road information, area information, weather information or a multimedia object associated with a forward path of the vehicle;

determine a current light intensity distribution of the vehicle headlight based on the multimedia object;

compare the current light intensity distribution of the vehicle headlight with an optimal light intensity distribution, wherein the optimal light intensity distribution is retrieved from a database based on at least one of the vehicle information, the vehicle speed, the road information, the area information or the weather information; and control the vehicle headlight based on the comparison.

9. The Headlight Controlling Device as claimed in claim 8, wherein the vehicle information comprises at least one of vehicle type, vehicle size or vehicle position.

10. The Headlight Controlling Device as claimed in claim 8, wherein the road information comprises at least one of road type, route number, driving side or road conditions.

11. The Headlight Controlling Device as claimed in claim 10, wherein the road type, the route number and the road conditions are determined based on a Global Positioning System.

12. The Headlight Controlling Device as claimed in claim 8, wherein the multimedia object comprises at least one of video and image.

13. The Headlight Controlling Device as claimed in claim 8, wherein the processor is configured to control the vehicle headlight by altering the headlight mode.

14. The Headlight Controlling Device as claimed in claim 8, wherein the processor is configured to control the vehicle headlight by altering the light Intensities of the vehicle headlight.

15. A non-transitory computer-readable medium storing instructions for assisted real-time control of a vehicle headlight, wherein upon execution of the Instructions by one or more processors, the processors perform operations comprising:

collecting at least one of vehicle information, vehicle speed, road information, area information, weather information or a multimedia object associated with a forward path of the vehicle;

determining a current light intensity distribution of the vehicle headlight based on the multimedia object;

comparing the current light intensity distribution of the vehicle headlight with an optimal light intensity distribution, wherein the optimal light intensity distribution is retrieved from a database based on at least one of the vehicle information, the vehicle speed, the road information, the area information or the weather information; and controlling the vehicle headlight based on the comparison.

* * * * *